US012577012B1

(12) United States Patent
Dwivedi et al.

(10) Patent No.: US 12,577,012 B1
(45) Date of Patent: Mar. 17, 2026

(54) AUTOMATED STRETCH WRAPPING WITHIN CLOSELY SPACED PALLETS

(71) Applicant: Amazon Technologies, Inc., Seattle, WA (US)

(72) Inventors: Rajeev Dwivedi, Sammamish, WA (US); Raymond Arthur Lund, Miami, FL (US); Vaibhav Rameshrao Deshmukh, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/367,249

(22) Filed: Sep. 12, 2023

(51) Int. Cl.
| | |
|---|---|
| *B65B 45/00* | (2006.01) |
| *B65B 11/02* | (2006.01) |
| *B65B 41/12* | (2006.01) |
| *B65B 57/12* | (2006.01) |
| *G06Q 10/087* | (2023.01) |
| *G01V 8/10* | (2006.01) |

(52) U.S. Cl.
CPC ............ *B65B 57/12* (2013.01); *B65B 11/025* (2013.01); *B65B 41/12* (2013.01); *B65B 45/00* (2013.01); *G06Q 10/087* (2013.01); *B65B 2210/20* (2013.01); *G01V 8/10* (2013.01)

(58) Field of Classification Search
CPC ......... B65B 35/50; B65B 11/00; B65B 9/135; B65B 11/06; B65B 11/18; B65B 9/00; B65B 41/12
See application file for complete search history.

(56) References Cited

U.S. PATENT DOCUMENTS

| | | | | | |
|---|---|---|---|---|---|
| 3,363,781 | A | * | 1/1968 | Magnetti .............. | B65G 57/303 |
| | | | | | 414/931 |
| 3,504,807 | A | * | 4/1970 | McWhorter Weir ........................ | |
| | | | | | B65G 1/1378 |
| | | | | | 209/587 |
| 4,439,084 | A | * | 3/1984 | Werkheiser .......... | B65G 57/245 |
| | | | | | 414/792.6 |
| 4,995,224 | A | * | 2/1991 | Yourgalite ............. | B65G 61/00 |
| | | | | | 53/540 |

(Continued)

OTHER PUBLICATIONS

Earflap Group. *Packaging machinery and end-of-line systems—Ear-Flap*, Jun. 9, 2023, https://web.archive.org/web/20230609055045/https://www.ear-flap.com/en/machines/.

*Primary Examiner* — Gloria R Weeks
(74) *Attorney, Agent, or Firm* — Kilpatrick Townsend & Stockton LLP

(57) ABSTRACT

An inventory management system can include a workspace defining a plurality of loading zones separated by passages and each sized to contain a palletized item stack. A carriage suspended over the workspace may move above the loading zones. An accessory may be coupled with the carriage and extend at least partially downward into the passages. The accessory can include a main body; a boom extending at least partially upward from the main body toward the carriage; a dispenser coupled with the main body and arranged for supporting a spool of stretch wrap material; and a driving wheel extending from the main body. The driving wheel may rotate against the target palletized item stack and propel the main body and the boom within the passages and along a perimeter of the target palletized item stack so that stretch wrap material is deployed around the target palletized item stack.

19 Claims, 6 Drawing Sheets

(56) References Cited

U.S. PATENT DOCUMENTS

| 5,046,303 | A | * | 9/1991 | Becicka | B65B 35/50 |
| | | | | | 53/540 |
| 5,148,651 | A | * | 9/1992 | Masuda | B65B 69/0033 |
| | | | | | 53/381.1 |
| 5,372,472 | A | * | 12/1994 | Winski | B65G 47/086 |
| | | | | | 414/789.9 |
| 5,423,163 | A | * | 6/1995 | Wendt | B65B 11/025 |
| | | | | | 53/556 |
| 5,515,666 | A | * | 5/1996 | Berger | B30B 9/3032 |
| | | | | | 53/529 |
| 5,630,695 | A | * | 5/1997 | McDonnell | B65G 61/00 |
| | | | | | 414/928 |
| 5,873,214 | A | * | 2/1999 | Moore | B65B 11/025 |
| | | | | | 53/399 |
| 5,941,050 | A | * | 8/1999 | Georgetti | B65B 11/025 |
| | | | | | 53/409 |
| 6,065,269 | A | * | 5/2000 | Malnati | B65B 11/025 |
| | | | | | 53/587 |
| 6,170,233 | B1 | * | 1/2001 | Marois | B65B 11/025 |
| | | | | | 53/399 |
| 6,453,643 | B1 | * | 9/2002 | Buscherini | B65B 11/025 |
| | | | | | 53/399 |
| 6,718,727 | B2 | * | 4/2004 | Focke | B65H 45/22 |
| | | | | | 198/348 |
| 6,866,471 | B2 | * | 3/2005 | Grams | B65G 61/00 |
| | | | | | 414/807 |
| 7,040,071 | B2 | * | 5/2006 | Heikaus | B65B 11/025 |
| | | | | | 53/210 |
| 7,047,710 | B2 | * | 5/2006 | Winkler | B65G 57/03 |
| | | | | | 414/416.11 |
| 8,074,431 | B1 | * | 12/2011 | Pierson | B65G 61/00 |
| | | | | | 53/529 |
| 8,167,530 | B2 | * | 5/2012 | Langlot | B65G 61/00 |
| | | | | | 414/419 |
| 8,240,973 | B2 | * | 8/2012 | Xu | B25J 9/045 |
| | | | | | 414/792.9 |
| 8,468,781 | B2 | * | 6/2013 | Fritzsche | B65G 57/06 |
| | | | | | 53/540 |
| 8,938,934 | B2 | * | 1/2015 | Brunson | B65B 13/181 |
| | | | | | 53/139.7 |
| 8,938,939 | B2 | * | 1/2015 | Roche | B65B 11/025 |
| | | | | | 53/390 |
| 9,975,654 | B2 | * | 5/2018 | Cere' | B65B 59/04 |
| 10,343,798 | B2 | * | 7/2019 | Jaconelli | B65B 11/00 |
| 10,934,034 | B2 | * | 3/2021 | Lancaster, III | B65B 11/025 |
| 10,934,107 | B2 | * | 3/2021 | Ducharme | B65G 57/00 |
| 11,643,229 | B2 | * | 5/2023 | Cousins | B65B 11/025 |
| | | | | | 53/399 |
| 11,845,191 | B1 | * | 12/2023 | Kuzhinjedathu | B23P 19/007 |
| 12,162,704 | B2 | * | 12/2024 | McCalib, Jr. | B25J 5/005 |
| 2003/0093973 | A1 | * | 5/2003 | Mir | B65B 11/025 |
| | | | | | 53/399 |
| 2004/0182050 | A1 | * | 9/2004 | Pieri | B65B 11/025 |
| | | | | | 53/556 |
| 2008/0131255 | A1 | * | 6/2008 | Hessler | B65B 35/50 |
| | | | | | 901/14 |
| 2009/0028676 | A1 | * | 1/2009 | Langlot | B65G 61/00 |
| | | | | | 414/331.09 |
| 2011/0192116 | A1 | * | 8/2011 | Bachelle | B65B 35/44 |
| | | | | | 53/381.1 |
| 2013/0061558 | A1 | * | 3/2013 | Klear | B65B 11/025 |
| | | | | | 53/218 |
| 2013/0081360 | A1 | * | 4/2013 | Smith | B65B 11/025 |
| | | | | | 53/493 |
| 2013/0212982 | A1 | * | 8/2013 | Baumann | B65G 57/06 |
| | | | | | 700/219 |
| 2013/0334008 | A1 | * | 12/2013 | Overley | B65D 71/063 |
| | | | | | 206/391 |
| 2014/0033657 | A1 | * | 2/2014 | Cere' | B65B 11/00 |
| | | | | | 53/461 |
| 2015/0101281 | A1 | * | 4/2015 | Kudia | B65B 57/18 |
| | | | | | 53/51 |
| 2015/0175283 | A1 | * | 6/2015 | Yohe | B65D 21/0201 |
| | | | | | 53/399 |
| 2015/0232219 | A1 | * | 8/2015 | Kern | B65B 5/106 |
| | | | | | 53/443 |
| 2016/0096274 | A1 | * | 4/2016 | Baylor | B25J 9/1687 |
| | | | | | 700/259 |
| 2016/0122053 | A1 | * | 5/2016 | Zierden | B65B 41/16 |
| | | | | | 53/556 |
| 2016/0200467 | A1 | * | 7/2016 | Cousins | B65B 11/025 |
| | | | | | 53/556 |
| 2019/0322451 | A1 | * | 10/2019 | Bastian, II | B65G 1/1375 |
| 2019/0352029 | A1 | * | 11/2019 | Sforacchi | B65B 11/58 |
| 2020/0239168 | A1 | * | 7/2020 | Sforacchi | B65B 61/22 |
| 2021/0139256 | A1 | * | 5/2021 | Fu | B65G 61/00 |
| 2021/0403190 | A1 | * | 12/2021 | Ito | B65G 57/03 |
| 2022/0227512 | A1 | * | 7/2022 | Schürkamp | B65B 59/003 |
| 2023/0150780 | A1 | * | 5/2023 | Hess | B65B 13/20 |
| | | | | | 414/798.2 |
| 2024/0010372 | A1 | * | 1/2024 | Casale | B65B 57/12 |

* cited by examiner

AUTOMATED STRETCH WRAPPING WITHIN CLOSELY SPACED PALLETS

BACKGROUND

Inventory systems, such as those in warehouses, supply chain distribution centers, airport luggage systems, and custom-order manufacturing facilities, face significant challenges in transporting inventory items. As inventory systems grow, the challenges of simultaneously completing a large number of tasks such as packing, storing, picking, staging, and other inventory-related tasks become non-trivial. One of the operations in the inventory system can involve palletizing items. Items may be placed in stacks on pallets and wrapped with a stretch wrap material, such as to facilitate stability during transport to other locations. Spaces allocated for palletizing can be restricted to existing infrastructure and layout of areas in various situations.

In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems may require significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Various embodiments herein relate to techniques for managing inventory items. Items may be provided (e.g., individually or in groups and/or within totes, boxes, or other packages) and may be consolidated into and/or onto pallets or other stacked formations for facilitating shipping or other transport. Devices may be provided to facilitate wrapping of stretch wrap material (e.g., plastic film or the like) around stacks of boxes, packages, or other items.

In various embodiments, the device can include a boom that supports an accessory from above. The accessory can include a stretch wrap material (e.g., a spool) and a wheel. The wheel may be motorized and/or otherwise able to follow or drive along an edge of a stack of items. As the wheel moves along the items, the stretch wrap may be deployed behind or trailing the accessory. The accessory can be moved around the perimeter of the stack to apply stretch wrap material, such as to retain the items in a suitably compact and/or reliably secure configuration.

In various embodiments, the accessory may be moved up or down along the stack to apply layers of the stretch wrap material in use. Upon completing a stretch wrapping operation, a tool (e.g., on the same or a different boom as the accessory) may be used to cut the stretch wrap material.

In various embodiments, the boom may include and/or be coupled with suitable structure for raising the accessory. For example, the boom may include or be coupled with a telescoping portion, a track, and/or other elevator to change a position of the accessory.

In various embodiments, the boom may be coupled with a carriage that may be positionable along lateral and longitudinal directions over palletized item stacks, such as by an overhead Cartesian positioning system. The carriage may be suitable for repositioning the accessory relative to different items stacks for processing different items stacks. For example, the carriage may be capable of moving the accessory above and/or in passages between items stacks. The carriage may enable movement within the passages in a manner that may be not otherwise viable by ground-based vehicles. For example, passages between stacks may be of a predetermined size that may be narrower than a suitable vehicle width and/or operating envelope. The predetermined size of passages may be based on a suitable size to permit human operators to pass between while still providing suitable density of storage space in use, for example.

Figure 1:
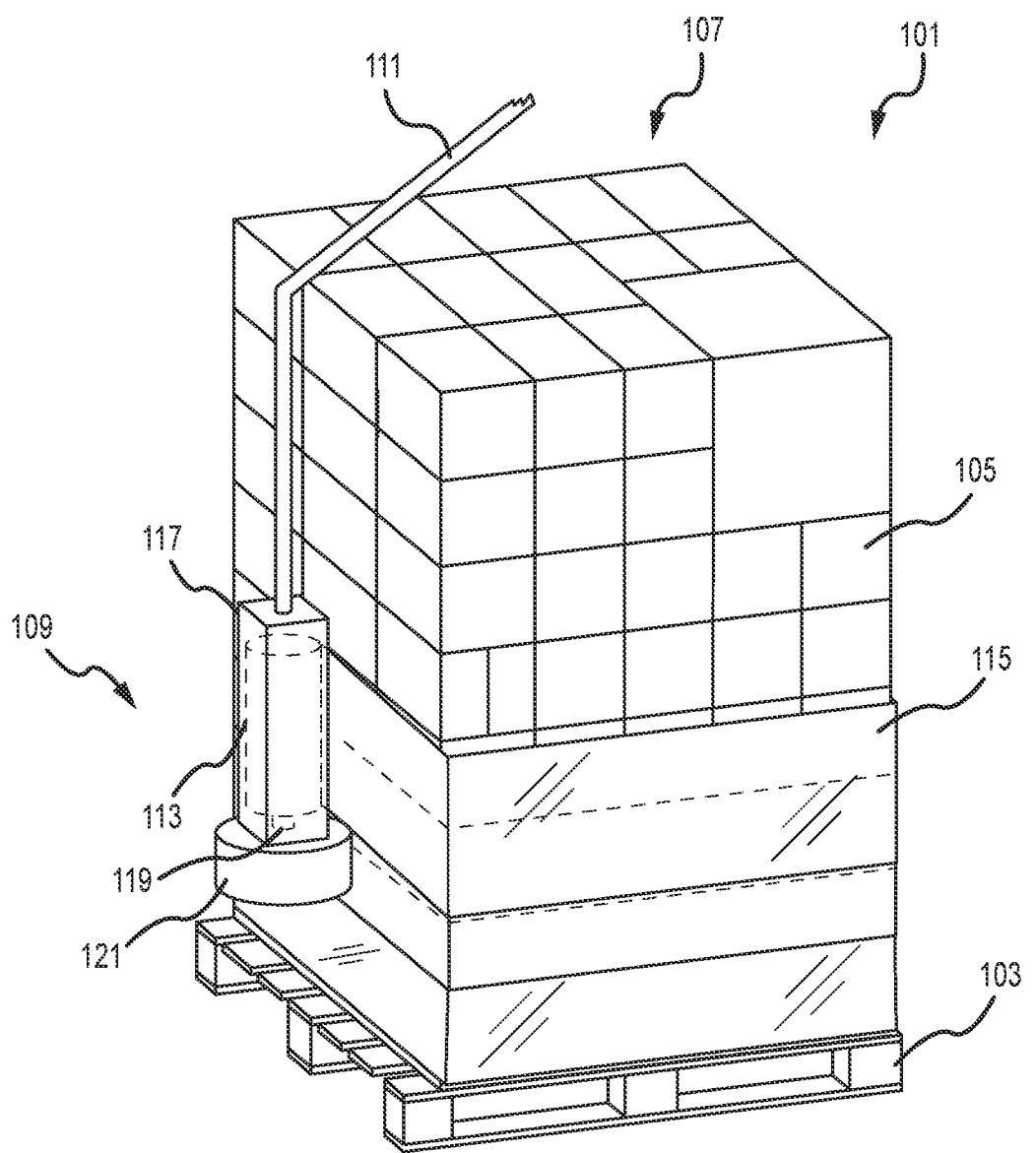
FIG. 1 illustrates some components that may be included in a system for applying stretch wrap material relative to items in accordance with some embodiments.

FIG. 1 illustrates examples of components that may be included in a system 101. The system 101 may include suitable components for operating relative to a pallet 103 and/or items 105. The items 105 may be arranged in a stack 107 of multiple items stacked one atop and/or adjacent one another. The items 105 can be of the same or different sizes and/or shapes relative to one another, for example. Although depicted as boxes in FIG. 1, the items 105 can correspond to totes, envelopes, packages, or other containers and/or form factors. The items 105 may be consolidated into the stacks 107 in use to facilitate transfer of the items 105 atop the pallets 103 among suitable locations for processing, for example.

The system 101 can include an accessory 109. The accessory 109 can include and/or be coupled with a boom 111. The boom 111 can include one or more rods, shafts, linkages, and/or any other suitable form of structural support. The boom 111 may support the accessory 109 from above, for example.

The accessory 109 can include and/or carry a spool 113 of stretch wrap material 115. The stretch wrap material 115 may correspond to a plastic film, a foil, or any other film, thin layer, or other sheet of material for wrapping and/or containing items 105 of the stack 107. The spool 113 may be rotatable to deploy the stretch wrap material 115, for example.

The accessory 109 can include a main body 117. The spool 113 may be included within or upon the main body 117. The boom 111 may extend from the main body 117. The boom 111 may extend at least partially upward from the main body 117 for supporting the main body 117 from above, for example. The boom 111 may extend at least partially upward and at least partially horizontally. For example, such orientation may be on account of including a bend, a joint, or other change in angle. The boom 111 may include a substantially vertical portion and an angled portion joined along a bend, joint, etc.

The main body 117 can include a dispenser 119 coupled with the main body 117 and arranged for supporting the spool 113 of stretch wrap material 115. The dispenser 119 is depicted as including a bottom-mounted mandrel about which the spool 113 may turn, although the dispenser 119 may include a top-mounted mandrel and/or any other suitable structure for supporting the stretch wrap material 115 and/or facilitating deployment in use.

The accessory 109 can include and/or be coupled with a wheel 121. The wheel 121 may be sized to extend from the main body 117 by a suitable distance to permit the stretch wrap material 115 to exit from the dispenser 119 and/or to be deployed from the dispenser 119 and to be applied to the stack 107 in use. The wheel 121 may drive along and/or travel along the stack 107, such as along a perimeter of the stack 107. The wheel 121 may be driven, for example. The wheel 121 may be arranged to rotate against the stack 107 and propel the main body 117 and the boom 111 along a perimeter of the stack 107. Traveling around the stack 107 may facilitate deployment of the stretch wrap material 115 around the stack 107 in use.

The main body 117 can be biased by the boom 111 toward the stack 107. Some examples of suitable structure to provide such biasing are described further with respect to FIG. 2.

Figure 2:
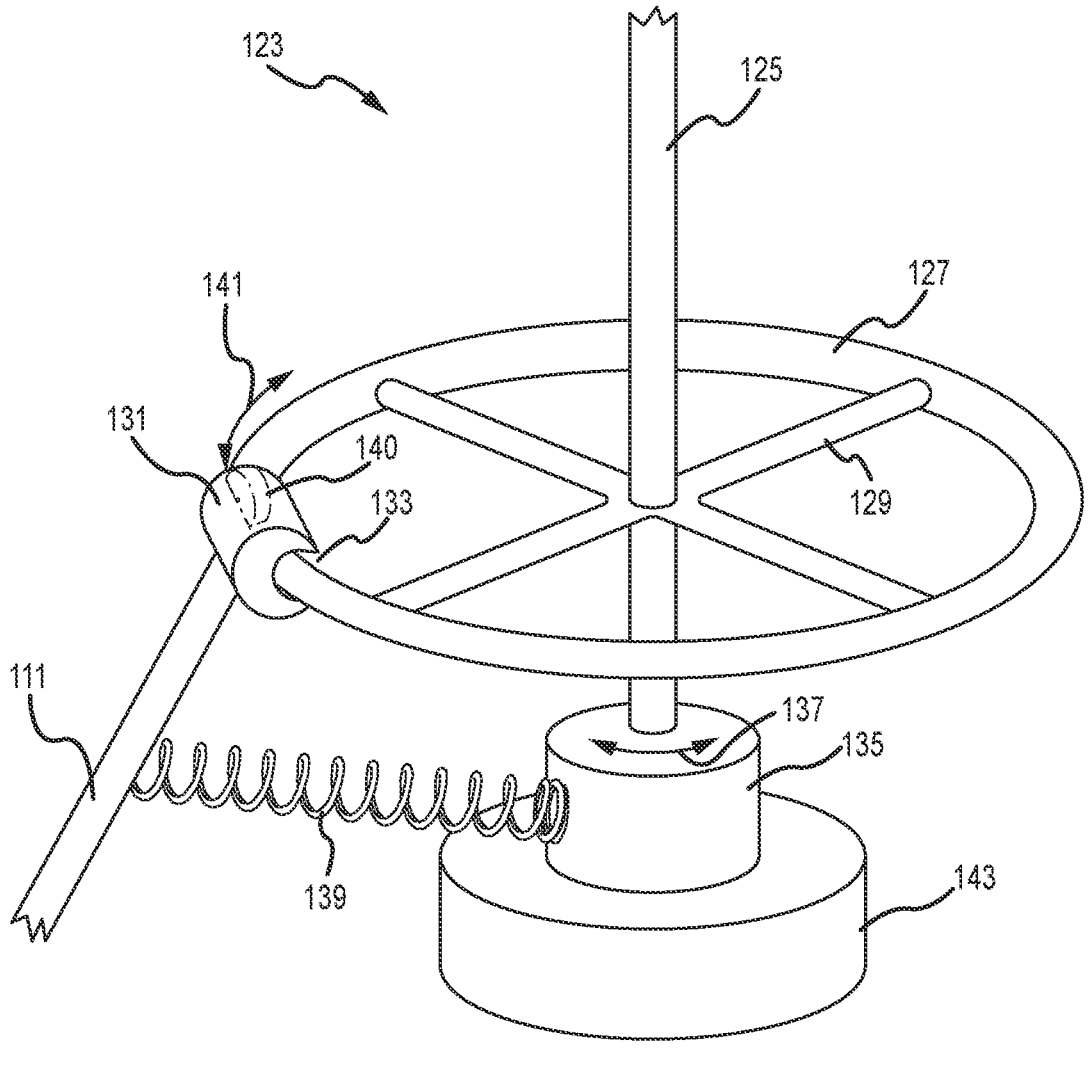
FIG. 2 illustrates some components that may be utilized for facilitating movement of elements of the system of FIG. 1 in accordance with some embodiments.

FIG. 2 illustrates an example of components that may be utilized for facilitating movement of the accessory 109 in accordance with some embodiments. The boom 111 may include or be coupled to a hub 123.

The hub 123 may include a spindle 125. The spindle 125 may extend downwardly from a suitable overhead support structure, for example.

The spindle 125 may support a track ring 127. The track ring 127 may be coupled by struts 129 to the spindle 125, for example. The struts 129 may extend radially from the spindle 125 and connect into an inner radius of the track ring 127.

The boom 111 may be coupled with a collar 131, which may be substantially C-shaped or otherwise suitably shaped to ride on the track ring 127. For example, a C-shape of the collar 131 may permit the collar 131 to travel circumferentially along an outer diameter of the track ring 127 without interfering with or being blocked by the presence of the struts 129 on an inner circumference of the track ring 127. For example, the collar 131 may include an opening 133 through which the struts 129 can fit as the collar 131 travels along the track ring 127. The opening 123 may face toward the track ring 127, for example. Although the struts 129 are shown coupled with an interior of the track ring 127, the struts 129 may alternatively engage an exterior (e.g., the collar 131 may be reversed or otherwise positioned differently from depicted, such as to travel along the interior circumference with the opening 133 of the C-shape extending towards the outside to avoid interference with the struts 129).

The boom 111 may be coupled with a biasing member 139. The biasing member 139 can correspond to a spring or other flexibly resilient material that may provide a biasing force on the boom 111. For example, the biasing member 139 may exert an inward force that pulls the boom 111 toward a center or toward the spindle 125 (e.g., toward a center of rotation of the boom 111). Pulling the boom 111 inward may provide an inward or central force that biases or urges the accessory 109 (FIG. 1) inward. For example, as may be appreciated with respect to FIG. 1, urging the accessory 109 inward may urge the wheel 121 and/or main body 117 toward and/or into contact with the stack 107. For example, referring to both FIG. 1 and FIG. 2, the biasing member 139 may allow the boom 111 to hold the accessory 109 against the stack 107 and accommodate for variations in girth and/or size of the stack 107 in operation. For example, the biasing member 139 may allow flexing of the boom 111 inwardly and/or outwardly from the perimeter of stack 107 as the wheel 119 travels along the perimeter of the stack 107. The boom 111 being biased may cause the wheel 121 to remain in contact against the stack 107 during travel in use.

Referring again to FIG. 2, the spindle 125 may further include a bearing 135. The bearing 135 may be rotatable around the spindle 125 (e.g., such as illustrated by arrow 137). The bearing 135 may be coupled by the biasing member 139 with the boom 111. The bearing 135 may move as the collar 131 moves. For example, the collar 131 may rotate (e.g., such as illustrated by arrow 141) and move along the track 127, which may cause a corresponding movement of the boom 111 that may pull on the biasing member 139 to cause the bearing 135 to also rotate (e.g., such as shown at arrow 137). For example, movement of the bearing 135 may allow alignment of the biasing member 139 to remain extending radially toward the spindle 125 from the boom 111. The bearing 135 may be supported on a stopper 143, which may correspond to a base or other structure upon which the bearing 125 may be supported or retained to avoid falling off of the spindle 125 in use.

The collar 131 may be advanced to move along and/or with the track 127 by any suitable structure. As previously noted, the collar 131 may be advanced by motion imparted by driving the wheel 121 (FIG. 1). Additionally or alternatively, the hub 123 may include a driver 140 that may supplement or replace the driving capacity for the wheel 121. For example, the driver 140 can include a motor and/or roller that may drive the collar 131 along the track ring 127. The driver 140 may be within or behind the collar 131, for example. Moreover, although the driver 140 is shown in connection with the collar 131, the driver 140 additionally or alternatively may be implemented to drive any moveable component of the hub 123 to impart motion that may in turn move other linked movable components. Non-limiting examples may include driver 140 directly moving the collar 131, the bearing 135, ends of struts 129, etc. Any other suitable arrangement for facilitating motion of the boom 111 may be utilized, including, but not limited to, an arrangement in which the collar 131 is fixed to the track 127 and/or the spindle 125 (such as directly or by the struts 129) with the spindle 125 being rotatable to impart or allow rotation of the boom 111.

Figure 3:
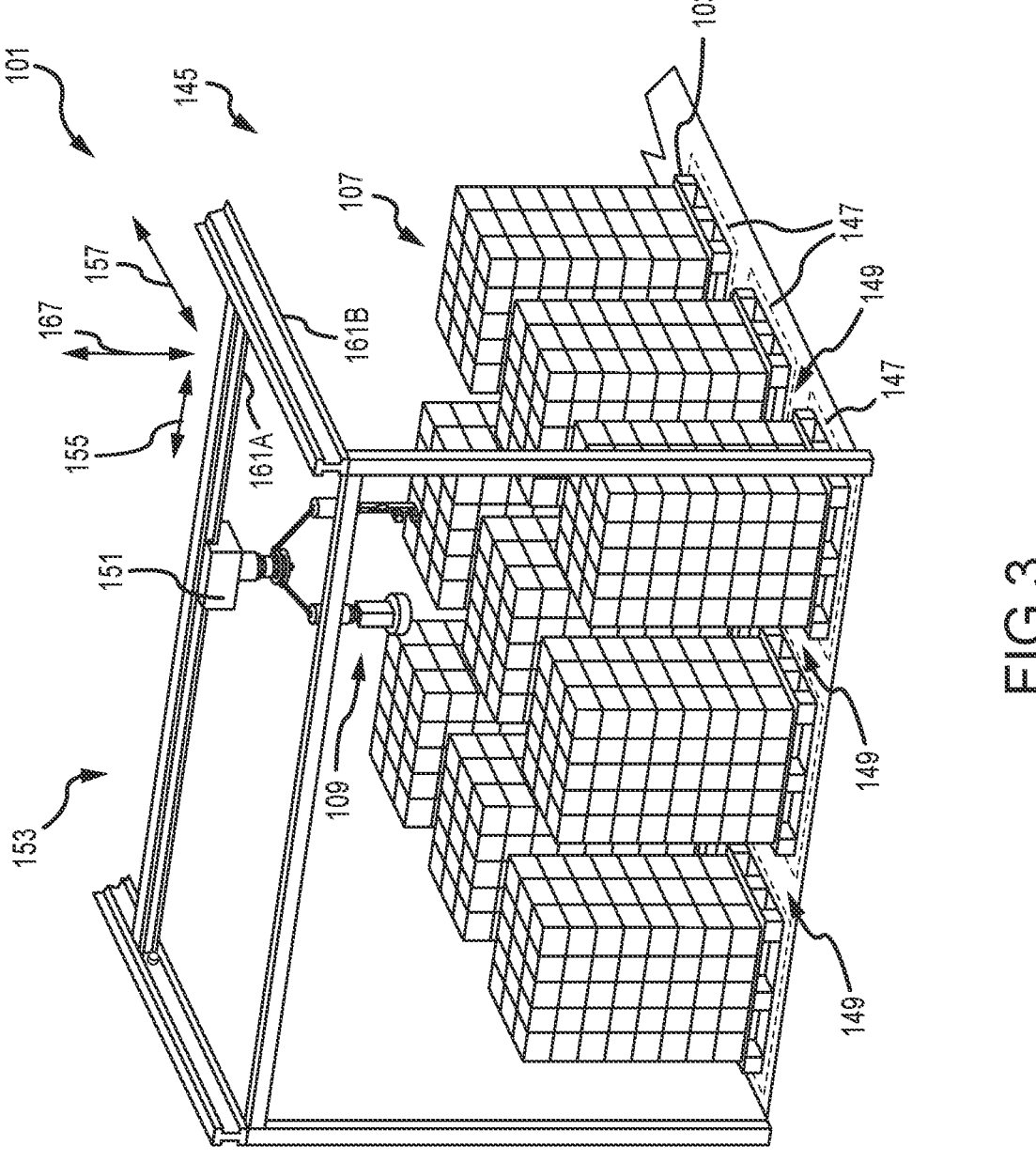
FIG. 3 illustrates an example of components of the system of FIG. 1 implemented within a workspace, such as within a warehouse, in accordance with some embodiments.

FIG. 3 illustrates a perspective view of elements of the system 101 implemented within a workspace 145, such as within a warehouse. The workspace 145 may include multiple stacks 107.

The workspace 145 may define loading zones 147 separated by passages 149 of predetermined size. The loading zones 147 may be sized for receiving pallets 103. For example, a loading zone 147 may be sized or arranged to be substantially occupied by a pallet 103 in use and/or may include a perimeter about the pallet 103 when the pallet 103 is received.

The passages 149 may be arranged in rows and/or columns. The passages 149 may be sized according to a predetermined size. In some cases, the predetermined size may be predetermined based on a configuration suitable for a target density of storage while also providing suitable spacing in the passages 149 for human operators to move for processing relative to the stacks 107. For example, stacks 107 may be processed by adding items 105 to the stacks.

The system 101 in FIG. 3 is shown with a carriage 151 suspended over a portion of the workspace 145 and movable above the loading zones 147. The carriage 151 may be suspended, for example, by an overhead Cartesian positioning system 153. The carriage may be included in or coupled with the overhead Cartesian positioning system 153. The Cartesian positioning system may be capable of moving along a lateral direction 155 and a longitudinal direction 157. The carriage 151 may be movable to position the accessory 109 in suitable position for operating relative to a selected stack 107.

Figure 4:
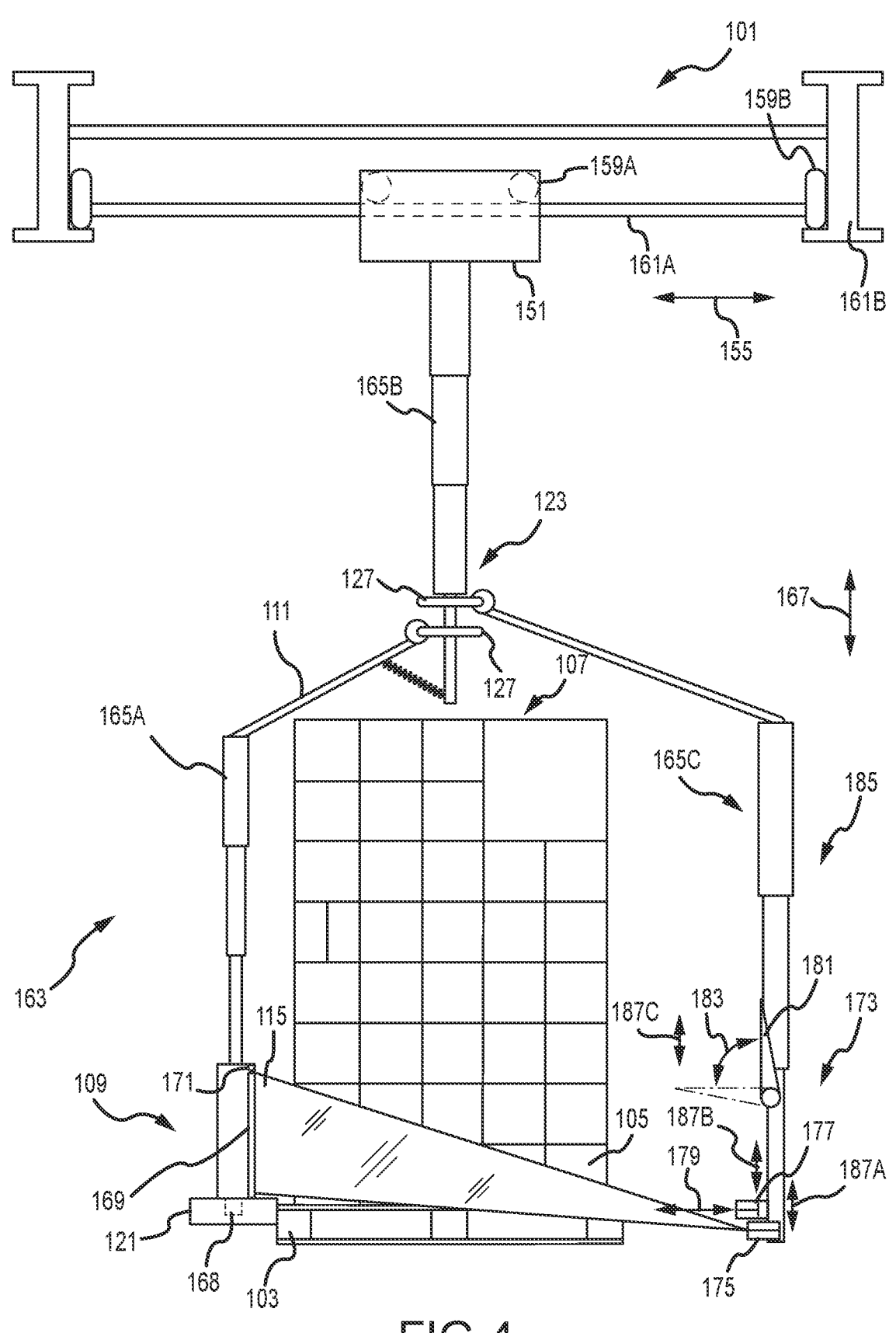
FIG. 4 illustrates a side perspective of various components that may be utilized in the system of FIG. 1 in accordance with some embodiments.

FIG. 4 illustrates a side perspective of further features that may be utilized with the system 101. The carriage 151 may travel on rollers 159A along a lateral beam 161A for movement in the lateral direction 155 and/or may travel along rollers 159B to travel along a longitudinal beam 161B for travel in the longitudinal direction 157 (FIG. 3). The lateral beam 161A and the longitudinal beam 161B may correspond to structure constrained to remain in an upper portion of the workspace 145 above the stacks 107 (e.g., which may be not operable to drive on a floor of the workspace 145). The carriage 151 similarly may be constrained to remain in an upper portion of the workspace 145 above the stacks 107 (e.g., on account of being supported from above by structure that is not operable to drive on a floor surface of the workspace 145).

The system 101 can include a suitable lift 163. The lift 163 may include any suitable combination of one or more structures to facilitate vertical movement relative to the stack 107. As non-limiting examples, the lift 163 shown in FIG. 4 includes a telescoping rod 165A as part of the boom 111 and a telescoping rod 165B supported by and/or included in the hub 123 and/or extending from and/or included in the carriage 151, although any form of rack and pinon, track, or other elevator or lift may be utilized to change a respective position of the accessory 109 in a vertical direction 167 relative to the stack 107 in use.

The accessory 109 in FIG. 4 is shown with further components that may facilitate operation in use. For example, the accessory 109 may include a motor 168. The motor 168 may be capable of turning the wheel 121, such as to drive the wheel 121.

The accessory 109 may include a pre-stretcher 169. The pre-stretcher 169 may correspond to and/or include a commercially available assembly or other suitable structure for imparting a predetermined and/or adjustable amount of tension to the stretch wrap material 115.

A sensor package 171 of one or more sensors may be included in or on the accessory 109. The sensor package 171 can include an optical sensor (e.g., a camera), a laser range finder, an acoustic sensor, and/or other suitable structure individually or in combination to detect a side of the stack 107, a corner of the stack 107, and/or a top of the stack 107. For example, detection of a side or an edge of the stack 107 may be useful in adjusting a speed at which the accessory 109 is being operated. In an illustrative example, as the accessory 109 approaches a corner of the stack 109 as detected by the sensor package 171, a traveling speed of the accessory 109 may be reduced to facilitate movement around the corner in a smooth transition without jumping off the corner. In another illustrative example, as the accessory 109 approaches a top of the stack 109 as detected by the sensor package 171, the accessory 109 may be controlled to discontinue adding layers above the detected top.

The accessory 109 may be supplemented by a tool 173. The tool 173 may include suitable components for manipulating the stretch wrap material 115 dispensed from the accessory 109.

As one example, the tool 173 can include or be coupled with a holder 175. The holder 175 may correspond to a grasper (such as a pincher) or member that may hold an end of the stretch wrap material 115 in a suitable location to impart tension during movement of the accessory 109. For example, the holder 175 may grasp a portion of the stretch wrap material 115 and/or may be capable of holding the stretch wrap material 115 against a side of the stack 107 (e.g., by pressing against the stack 107 so the stretch wrap material is sandwiched between a part of the stack 107 and a part of the holder 175).

The tool 173 additionally or alternatively may include a fastening system 177. The fastening system 177 may include structure suitable for fastening a portion of the stretch wrap material 115 to the pallet 103, an item 105, and/or other structure associated with the stack 107. For example, the fastening system 177 include a stapler, a tack emitter, an adhesive applicator, or any other suitable form of dispenser of fasteners. The fastening system 177 additionally or alternatively may include structure capable of performing other fastening techniques, such as, but not limited to, heat lamps or blowers to improve adhesion between the stretch wrap material 115 and other layers of the stretch wrap material 115 and/or underlying structure such as items 105 and/or pallets 103.

The fastening system 177 and/or the holder 175 may be extendable and/or retractable relative to the stack 107, such as illustrated by arrow 179. For example, suitable actuators may be included for such functionality.

The tool 173 additionally or alternatively can include a cutter 181. The cutter 181 may include a blade, edge, or other suitable structure for severing the stretch wrap material 115. The cutter 181 may be deployable, such as illustrated by arrow 183. The cutter 181 is shown as being pivotable (e.g., along a hinge) to move in or out of position between stowed or deployed positions, although translation and/or any other deployment option may be utilized.

The tool 173 may include at least some portion included on and/or supported by a secondary boom 185. The secondary boom 185 may be coupled with the hub 123 in a similar manner as the main boom 111. The secondary boom 185 can include a lift 165C, which may correspond to a telescoping rod or other suitable lifting structure in the secondary boom 185 or elsewhere positioned relative to the carriage 151 (e.g., between the carriage 151 and the hub 123, such as shown by telescoping rod 165B).

The tool 173 is not limited to a secondary boom 185. In some examples, different forms of the tool 173 may be included on the accessory 109, such as extending from the main body 117 or separately movable relative to the main body 117. In some examples, the tool 173 may include different components on difference support structures (such as a first secondary boom 185, a second secondary boom 185, a third secondary boom 185, etc.)

Elements of the tool 173 may be capable of being raised and/or lowered in the vertical direction 167, such as illustrated by arrow 187A, 187B, and 187C. Movement in the vertical direction 167 may be accomplished by the lift 163, such as by a telescoping rod 165A relative to the main boom 111, a telescoping rod 165B relative to the carriage 151, a telescoping rod 165C relative to the secondary boom 185, and/or other forms of lift 163 to affect movement within a passage along the vertical direction 167.

The main boom 111 may be sized and shaped to be able to rotate along a path that can pass without contacting or interfering with the secondary boom 185. For example, the secondary boom 185 may extend outwardly (e.g., in the lateral direction 155 and/or the longitudinal direction 157 (e.g., FIG. 3)) further than the boom 111. The main boom 111 and the secondary boom 185 may be spaced outwardly from a center or from the hub 123 by different amounts in order to provide clearance for the main boom 111 relative to the second boom 185. For example, the main boom 111 may pass inwardly of the secondary boom 185 in operation.

In operation, the main boom 111 may perform one or multiple rotations around the stack 107, during which time the secondary boom 185 may remain in a stationary location or may also move around the stack 107 to a suitable location for operation of the tool 173. In an illustrative example, the secondary boom 185 may be implemented upon starting and/or finishing a wrapping operation by the main boom 111, such as to hold, fasten, and/or cut the stretch wrap material 115 to start and/or complete the wrapping operation.

The secondary boom 185 can be moved in any suitable manner. In some embodiments, the secondary boom 185 can include or be coupled with a driver 140 (FIG. 2), for example. In various examples, the secondary boom 185 may be driven by a driver 140 and/or may be movable without also including a structure equivalent to the wheel 121 (FIG. 1) for coming into direct contact with the stack 107. For example, whereas the main boom 111 may be driven by the wheel 121 (such as by the motor 168 (FIG. 4)) and/or by the driver 140 (FIG. 2) to impart rotation (such as shown at arrow 141 in FIG. 2), the secondary boom 185 may be driven by a driver 140 along an equivalent structure of the hub 123 that may be utilized for the secondary boom 185. For example, separate track rings 127 are shown in FIG. 4 for the main boom 111 and the secondary boom 185. Additional instances of the secondary boom 185 (e.g., if present to provide individually controllable components of the tool 173) may be movable along additional layers of track rings 127 etc.

Figure 5:
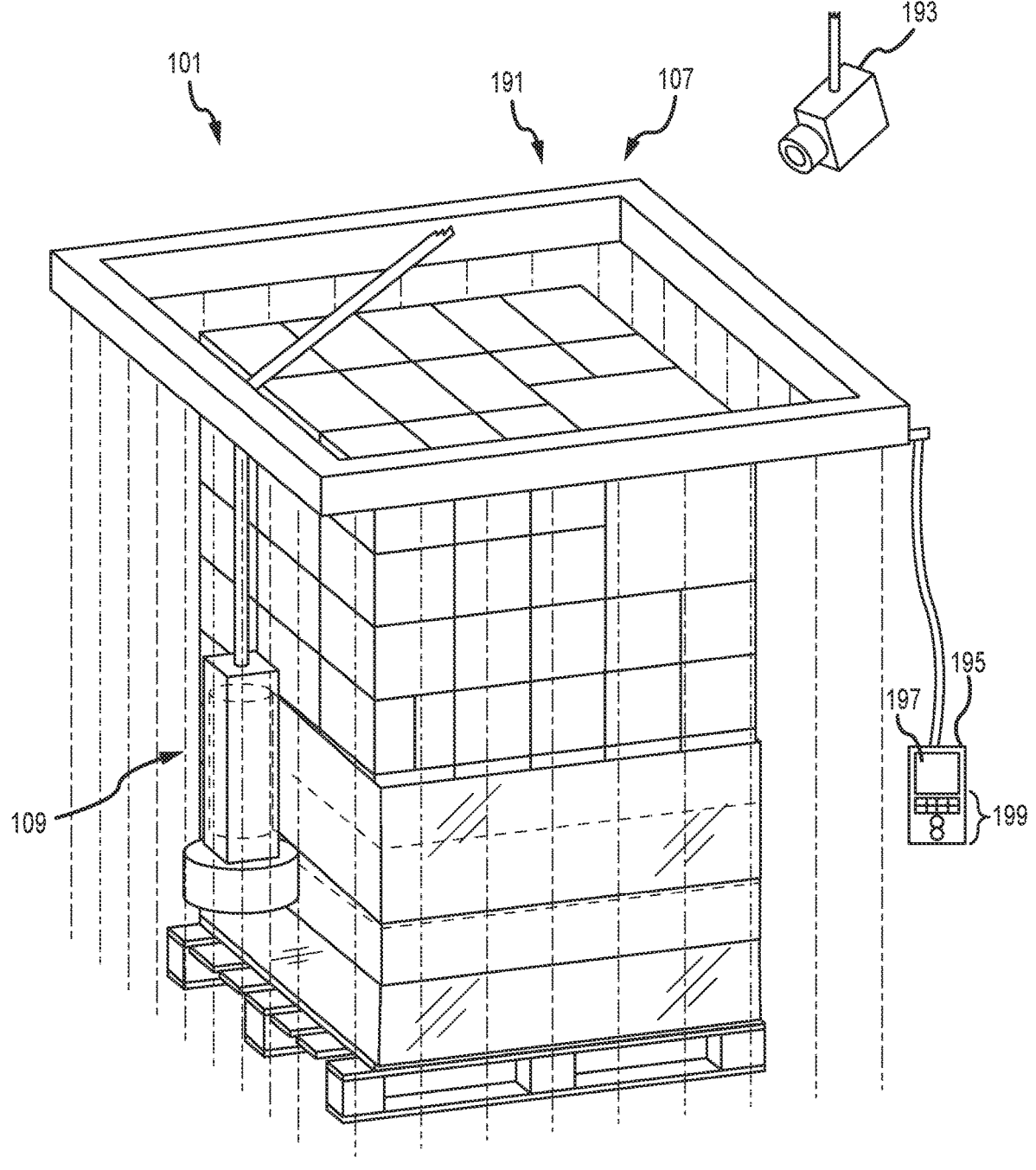
FIG. 5 illustrates further components that may be utilized within the system of FIG. 1 in accordance with some embodiments.

FIG. 5 illustrates further components that may be utilized within the system 101. For example a proximity detection system 191 may be implemented. The proximity detection system 191 may correspond to a light curtain framework that may include suitable structures to emit a curtain of light and detect if the curtain of light is interrupted at any point, e.g., to detect if a person or object has entered into a zone around the stack 107. For example, monitoring a zone around the stack 107 may facilitate control of the accessory 109 to avoid collisions in the space (such as to stop moving or move in an unoccupied area instead upon detecting another object within the space).

The system 101 can include cameras or optical sensors 193. Optical sensors 193 may be utilized to provide machine vision, such as to determine if objects are nearby a stack 107 and/or to determine if stacks 107 are ready for a wrapping operation. In use, wrapping operations may be implemented at any suitable interval or threshold. As nonlimiting examples, wrapping operations may be implemented when a stack is one third built, two thirds built, and/or fully built to 72 inches tall or another predetermined height. Wrapping may include one or more passes of the stretch wrap material 115. For example, in some scenarios a wrapping operation includes supplying one set of overlapping wraps while moving between top and bottom of the relevant portion stack 107 to be wrapped during the operation and then subsequent wraps are applied thereafter. Additionally or alternatively, multiple layers may be applied at one elevation before progressing up or down to another elevation at which another set of one or multiple layers may be applied (e.g., in overlapping in relationship). Wrapping may be performed while moving up along the stack 107 and/or while moving down along the stack 107. The wrapping may be at least partially angled upward or downward during rotation about the stack 107.

The system 101 can include a user interface 195. The user interface 195 is depicted with a screen 197 (e.g., a touch screen) and buttons 199, although any suitable combination of features may be utilized for permitting a user to provide input and/or receive output relating to the system 101. The user interface 195 is also depicted as connected with a tether extending from overhead structure of the system 101, although any wired or wireless structure may be utilized. Non-limiting examples of other options may include a smart phone, mobile device, laptop, desktop, or other console configured to provide functionality of the user interface 195. In various examples, the user interface 195 may enable a user to provide input for—and/or receive output about— operation of the system 101 (such as in relation to speed, number of wraps, amount of overlap of wrapping layers, vertical height to cover, and/or other parameters for wrapping operations for the stack 107, which may include locations for operation of the holder 175, fastening system 177, and/or cutter 181 or a location for a subsequent stack 107 to process).

Figure 6:
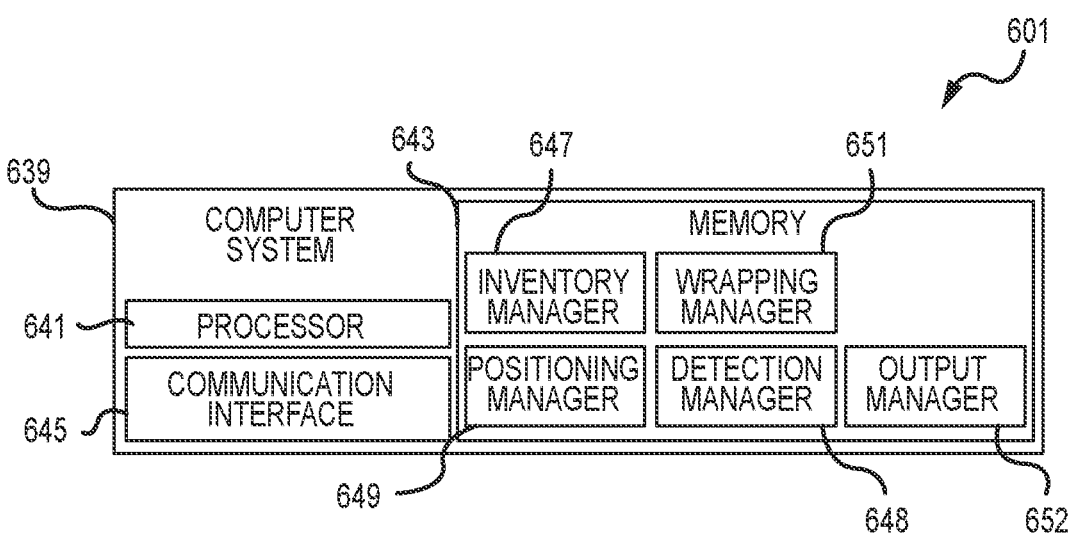
FIG. 6 is a block diagram illustrating various control aspects that may be implemented for the system of FIG. 1.

FIG. 6 illustrates a block diagram of a system 601 that may include a computer system 639. The system 601 can be an example of the system 101. For example, the system 601 may include other components described herein with respect to system 101. Various elements in the system 601 can be controlled by or otherwise interact with the computer system 639. The computer system 639 can include a processor 641, memory 643, and a communication interface 645. In general, the computer system 639 may function as a controller that controls other components of the system 601, for example, as described further below. Various elements of the system 601 can function as appropriate inputs and/or outputs for the control of the system 601 by the computer system 639.

The illustrated computer system 639 includes a communication interface 645, a processor 641, and a memory 643. The illustrated computer system 639 is also shown with an inventory manager 647, a positioning manager 649, a wrapping manager 651, a detection manager 648, and an output manager 652. The computer system 639 may represent a single component, multiple components located at a central location within the system 601, or multiple components distributed throughout the system 601. In general, computer system 639 may include any appropriate combination of hardware and/or software suitable to provide the described functionality.

The processor 641 can be operable to execute instructions associated with the functionality provided by computer system 639. The processor 641 may comprise one or more general purpose computers, dedicated microprocessors, or other processing devices capable of communicating electronic information. Examples of the processor 641 include one or more application-specific integrated circuits (ASICs), field programmable gate arrays (FPGAs), digital signal processors (DSPs) and any other suitable specific or general-purpose processors.

The memory 643 can store processor instructions, inventory requests, state information for the various components of system 601 and/or any other appropriate values, parameters, or information utilized by computer system 639 during operation. The memory 643 may represent any collection and arrangement of volatile or nonvolatile, local or remote devices suitable for storing data. Examples of the memory 643 include, but are not limited to, random access memory (RAM) devices, read only memory (ROM) devices, magnetic storage devices, optical storage devices or any other suitable data storage devices.

The communication interface 645 can facilitate communication between the computer system 639 and other components of the system 601, including, but not limited to, information and/or instructions conveyed between any of the inventory manager 647, the positioning manager 649, the wrapping manager 651, the detection manager 648, and the output manager 652, and/or other components of the components of the system 601. These communications may represent communication of any form appropriate based on the capabilities of the computer system 639 and may include any suitable information. Depending on the configuration of the computer system 639, the communication interface 645 may be responsible for facilitating either or both of wired and wireless communication between the computer system 639 and the various components of system 601. In particular embodiments, the computer system 639 may communicate using communication protocols such as 802.11, Bluetooth, or Infrared Data Association (IrDA) standards.

In general, the inventory manager 647, the positioning manager 649, the wrapping manager 651, the detection manager 648, the output manager 652, and the communication interface 645 may each represent any appropriate hardware and/or software suitable to provide the described functionality. In addition, as noted above, the computer system 639 may, in particular embodiments, represent multiple different discrete components and any or all of the inventory manager 647, the positioning manager 649, the wrapping manager 651, the detection manager 648, the output manager 652, and the communication interface 645 may represent components physically separate from the remaining elements of the computer system 639. Moreover, any two or more of the inventory manager 647, the positioning manager 649, the wrapping manager 651, the detection manager 648, the output manager 652, and the communication interface 645 may share common components. For example, in particular embodiments, the inventory manager 647, the positioning manager 649, the wrapping manager 651, the detection manager 648, and the output manager 652 represent computer processes executing on the processor 641 and communication interface 645 comprises a wireless transmitter, a wireless receiver, and a related computer process executing on processor 641.

The communication interface 645 may communicate with the user interface 195 (FIG. 5). In some embodiments, elements of the computer system 639 may be incorporated into and or otherwise communicate with the user interface 195. For example, the computer system 639 may cause the user interface 195 to visually display, auditorily emit, or otherwise provide instructions to an operator regarding handling of items 105 or other tasks associated with operations of the system 601 (which may include loading or changing the spool 113 of stretch wrap material 115, positioning the main boom 111, the secondary boom 185, and/or the tool 173 in a suitable starting position or other position, or performing maintenance or other actions). In some examples, the user interface 195 may permit an operator to input instructions or changes for operations of the system facilitated by the computer system 639.

In operation, the inventory manager 647 may control (e.g., maintain, manage, adjust, and/or process) information about items 105. Such information may include information about identities of items 105, groupings of items 105 within stacks 107, locations of items 105 to be received from a storage area to add to a stack 107, and/or information about destinations to which a given pallet 103, item 105, and/or stack 107 is assigned for delivery.

The positioning manager 649 can control aspects relating to positioning of elements of the system 601. For example, the positioning manager 649 can provide instructions to the overhead Cartesian positioning system 153, the carriage 151, the lift 163, the driver 140, the wheel 121, the motor 158, and/or other components capable of imparting motion. The positioning manager 649 may control movement of elements of the system 601 within the workspace 145. As one non-limiting example, the positioning manager 649 may control the overhead Cartesian positioning system 153, the carriage 151, and the lift 163 to suitably move from a position relative to one stack 107 to a position relative another stack 107. As another non-limiting example, the positioning manager 649 may control the overhead Cartesian positioning system 153, the carriage 151, the lift 163, the driver 140, the wheel 121, the motor 158, and/or the tool 173 to affect positioning before, during, and/or after a wrapping operation relative to a given stack 107.

The wrapping manager 651 can control aspects relating to wrapping operations of the system 601. As non-limiting examples, the wrapping manager 651 control speed, number of wraps, amount of overlap of wrapping layers, vertical height to cover, and/or other parameters for wrapping operations for the stack 107, which may include locations for operation of the holder 175, fastening system 177, and/or cutter 181 or a location for a subsequent stack 107 to process. The wrapping manager 651 (e.g., directly or through the positioning manager 149) can provide instructions to the overhead Cartesian positioning system 153, the carriage 151, the lift 163, the driver 140, the wheel 121, the motor 158, the tool 173, and/or other components capable of imparting motion to accomplish wrapping operations. The wrapping manager 651 may control actuation of the tool 173. The wrapping manager 651 may control rotation, vertical positioning, lateral positioning, and/or longitudinal positioning of the accessory 109, the tool 173, the main boom 111, and/or the secondary boom 185 for wrapping operations.

The detection manager 648 may control information about and/or operation based on sensing performed within the system 601. For example, the detection manager 648 may obtain data from—and/or implement control based on—information from the sensor package 171 of the accessory 109, the proximity detection system 191, and/or the optical sensors 193. As one illustrative example, the detection manager 648 may use information from detection to provide control (e.g., through the wrapping manager 151 and/or the positioning manager 149) regarding operation of the accessory 109 (such as adjusting a speed or positioning based on detection of a side edge or top of the stack 107 in use). As another illustrative example, the detection manager 648 may use information from detection to determine item identity information about items 105 on the pallet 103 and/or in the stack 107 and/or identity information about the pallet 103 and/or the stack 107. In some embodiments, this may correspond to visual recognition of labels, such as optical recognition of shipping addresses, tracking numbers, or other identifiers. The labels may correspond to sheets that are added to items 613 by adhesive or other techniques and/or may correspond to markings printed onto, integrally formed in, or otherwise present on the items 613. In some embodiments, item identity information additionally or alternatively may be determined based on unique item characteristics, such as shape, color, size, and/or patterns (e.g., independently from labels or in conjunction with labels). Identity information from the detection manager 648 may be utilized with information from the inventory manager 647 to determine a destination location to be utilized, for example. As another illustrative example, the detection manager 648 may use information from detection to determine which stacks 107 may be ready for a wrapping operation, e.g., such that the accessory 109 can be sent to a ready stack 107 to perform a wrapping operation in response. As another illustrative example, the detection manager 648 may use information from detection to determine if a relevant space around a stack 107 is sufficiently clear of obstructions for a wrapping operation or for travel through the space, e.g., such that the operation can be paused or delayed until the relevant space is clear and/or such that a different path or space can be selected and used.

The output manager 652 may control information about and/or operation of the user interface 195 and/or other component that may be capable of providing information to users or operators of the system 601. As one example, the output manager 652 may control what information is displayed or communicated about settings currently implemented for the system 601 and/or regarding timing of operation of components. As an illustrative example, the output manager 652 may control messages that are provided visually and/or auditorily to an operator to re-locate in response to detection within a relevant area (such as by the proximity detection system 191) or to perform another relevant operation relative to components of the system 601.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An inventory management system, comprising:

a workspace within a warehouse environment and defining a plurality of loading zones separated by passages of predetermined sizing;

a plurality of pallets distributed among the loading zones;

a plurality of items distributed among the plurality of pallets in palletized item stacks;

an overhead Cartesian positioning system suspended over the workspace and comprising a carriage moveable along lateral and longitudinal directions along structure constrained to remain in an upper portion of the workspace over the palletized item stacks; and an accessory coupled with the carriage and positionable to extend at least partially downward from the carriage into the passages around a target palletized item stack and rotatable through the passages to apply stretch wrap material from a spool to the target palletized item stack, wherein the accessory comprises:

a main body;

a boom extending at least partially upward from the main body toward the carriage;

a dispenser coupled with the main body and arranged for supporting the spool of stretch wrap material; and a driving wheel extending from the main body, the driving wheel arranged to rotate against the target palletized item stack and propel the main body and the boom along a perimeter of the target palletized item stack so as to facilitate deployment of the stretch wrap material around the target palletized item stack.

2. The inventory management system of claim 1, wherein the overhead Cartesian positioning system is coupled with a proximity detection system configured to emit a light curtain and detect entry of an object into an area in response to interruption of the light curtain.

3. The inventory management system of claim 1, further comprising at least one optical sensor configured for providing information for identifying at least one palletized item stack ready for a wrapping operation.

4. The inventory management system of claim 1, further comprising a lift coupled with the carriage and operable for raising the accessory relative to the palletized item stacks.

5. An inventory management system, comprising:

a workspace defining a plurality of loading zones separated by passages and each sized to contain a palletized item stack;

a carriage suspended over the workspace and moveable above the loading zones; and an accessory coupled with the carriage and positionable to extend at least partially downward from the carriage into the passages, wherein the accessory is moveable within the passages and around a target palletized item stack to apply stretch wrap material to the target palletized item stack, wherein the accessory comprises:

a main body;

a boom extending at least partially upward from the main body toward the carriage;

a dispenser coupled with the main body and arranged for supporting a spool of stretch wrap material; and a driving wheel extending from the main body, the driving wheel arranged to rotate against the target palletized item stack and propel the main body and the boom along a perimeter of the target palletized item stack so as to facilitate deployment of the stretch wrap material around the target palletized item stack.

6. The inventory management system of claim 5, further comprising a tool configured to manipulate the stretch wrap material deployed from the accessory.

7. The inventory management system of claim 6, wherein the boom comprises a main boom supporting the accessory; and wherein the inventory management system further comprises a secondary boom supporting the tool.

8. The inventory management system of claim 6, wherein the tool comprises a holder configured to hold an end of the stretch wrap material in a suitable location to impart tension during movement of the accessory.

9. The inventory management system of claim 6, wherein the tool comprises a fastening system configured to fasten a portion of the stretch wrap material to at least a portion of the target palletized item stack.

10. The inventory management system of claim 6, wherein the tool comprises a cutter operable to sever the stretch wrap material.

11. The inventory management system of claim 5, wherein the carriage is constrained to remain in an upper portion of the workspace on account of being supported by structure that is not operable to drive on a floor of the workspace.

12. An inventory management system, comprising:

an accessory configured for movement among passages defined between loading zones sized for containing palletized item stacks, the accessory comprising:

a main body;

a boom extending at least partially upward from the main body for supporting the main body from above;

a dispenser coupled with the main body and arranged for supporting a spool of stretch wrap material; and a driving wheel extending from the main body, the driving wheel arranged to rotate against a target palletized item stack and propel the main body and the boom along a perimeter of the target palletized item stack so as to facilitate deployment of the stretch wrap material around the target palletized item stack.

13. The inventory management system of claim 12, further comprising a sensor package in or on the main body and configured to provide information for detecting at least one of a side, a corner, or a top of the target palletized item stack.

14. The inventory management system of claim 12, wherein the boom extends at least partially upward and at least partially horizontally.

15. The inventory management system of claim 12, further comprising:

a ring supported from above; and a collar coupled with or included in the boom and arranged to ride on the ring in response to movement imparted by the driving wheel along the target palletized item stack.

16. The inventory management system of claim 12, further comprising a biasing member coupled with the boom and arranged to impart a biasing force that biases the boom inwardly toward a center of rotation so as to urge the driving wheel toward contact with the target palletized item stack.

17. The inventory management system of claim 12, further comprising a lift supported by the boom and operable for raising the accessory relative to the target palletized item stack.

18. The inventory management system of claim 17, wherein the lift comprises a telescoping member.

19. The inventory management system of claim 12, wherein the accessory is moveable within a workspace defining the loading zones and the passages, wherein the inventory management system further comprises:

a carriage suspended over the workspace and moveable above the loading zones, wherein the accessory is coupled with the carriage and positionable to extend at least partially downward from the carriage into the passages, wherein the accessory is moveable within the passages and around the target palletized item stack to apply stretch wrap material to the target palletized item stack.

* * * * *